(12) United States Patent
Lee

(10) Patent No.: US 10,737,676 B2
(45) Date of Patent: Aug. 11, 2020

(54) SOLENOID VALVE

(71) Applicant: MANDO CORPORATION, Gyeonggi-do (KR)

(72) Inventor: Chung Jae Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/289,588

(22) Filed: Feb. 28, 2019

(65) Prior Publication Data
US 2019/0283726 A1 Sep. 19, 2019

(30) Foreign Application Priority Data
Mar. 14, 2018 (KR) .................. 10-2018-0029908

(51) Int. Cl.
| | | |
|---|---|---|
| *F16K 31/02* | (2006.01) | |
| *B60T 15/02* | (2006.01) | |
| *B60T 13/68* | (2006.01) | |
| *F16K 31/06* | (2006.01) | |
| *B60T 8/36* | (2006.01) | |

(52) U.S. Cl.
CPC ............ *B60T 15/028* (2013.01); *B60T 8/363* (2013.01); *B60T 13/686* (2013.01); *F16K 31/0634* (2013.01)

(58) Field of Classification Search
CPC ...... B60T 15/028; B60T 8/363; B60T 13/686; F16K 31/0634
USPC .................. 137/625.69, 487.5; 251/129.15
See application file for complete search history.

(56) References Cited

U.S. PATENT DOCUMENTS

| | | | | |
|---|---|---|---|---|
| 5,791,747 | A * | 8/1998 | Sorensen ................. | B60T 8/36 251/129.02 |
| 5,803,556 | A * | 9/1998 | Weis ....................... | B60T 8/365 137/614.19 |
| 5,879,060 | A * | 3/1999 | Megerle .................. | B60T 8/363 251/129.02 |
| 5,895,026 | A * | 4/1999 | Linkner, Jr. ........... | B60T 8/3615 251/129.15 |
| 6,065,734 | A * | 5/2000 | Tackett ................... | B60T 8/363 251/129.02 |
| 6,113,066 | A * | 9/2000 | Hohl ....................... | B60T 8/363 251/129.02 |
| 6,124,775 | A * | 9/2000 | Linkner, Jr. ............ | B60T 8/363 251/129.15 |
| 6,364,430 | B1 * | 4/2002 | Park ........................ | B60T 8/363 251/129.02 |
| 6,450,590 | B1 * | 9/2002 | Leventhal ............... | B60T 8/363 251/129.02 |
| 6,679,567 | B1 * | 1/2004 | Tackett ................... | B60T 8/363 251/129.15 |
| 6,778,051 | B2 * | 8/2004 | Shirase ................... | B60T 8/363 251/129.01 |

(Continued)

FOREIGN PATENT DOCUMENTS

| | | |
|---|---|---|
| KR | 10-0726555 | 6/2007 |
| KR | 10-0774133 | 11/2007 |

*Primary Examiner* — Minh Q Le
(74) *Attorney, Agent, or Firm* — Ladas & Parry, LLP

(57) ABSTRACT

Disclosed is a solenoid valve which is installed in a bore of a modulator block having a first hydraulic port and a second hydraulic port to control a flow of a braking fluid. The solenoid valve can reduce the number of components by integrating the components and implement a check valve function.

12 Claims, 14 Drawing Sheets

(56) References Cited

U.S. PATENT DOCUMENTS

| | | | | |
|---|---|---|---|---|
| 6,846,408 | B2* | 1/2005 | Knight | B60T 8/3615 |
| | | | | 137/550 |
| 7,341,320 | B2* | 3/2008 | Otsuka | B60T 8/3615 |
| | | | | 303/119.2 |
| 2001/0050347 | A1* | 12/2001 | Otsuka | B60T 8/363 |
| | | | | 251/129.15 |
| 2003/0201418 | A1* | 10/2003 | Ahn | B60T 8/363 |
| | | | | 251/129.15 |
| 2004/0251737 | A1* | 12/2004 | Starr | B60T 8/363 |
| | | | | 303/119.2 |
| 2011/0221264 | A1* | 9/2011 | Saita | B60T 8/36 |
| | | | | 303/20 |
| 2018/0362005 | A1* | 12/2018 | Kwak | B60T 8/363 |
| 2019/0061718 | A1* | 2/2019 | Hattori | B60T 13/146 |
| 2019/0077388 | A1* | 3/2019 | Lee | F16K 1/42 |
| 2019/0100179 | A1* | 4/2019 | Lee | B60T 8/4081 |
| 2019/0135256 | A1* | 5/2019 | Lee | B60T 13/662 |

\* cited by examiner

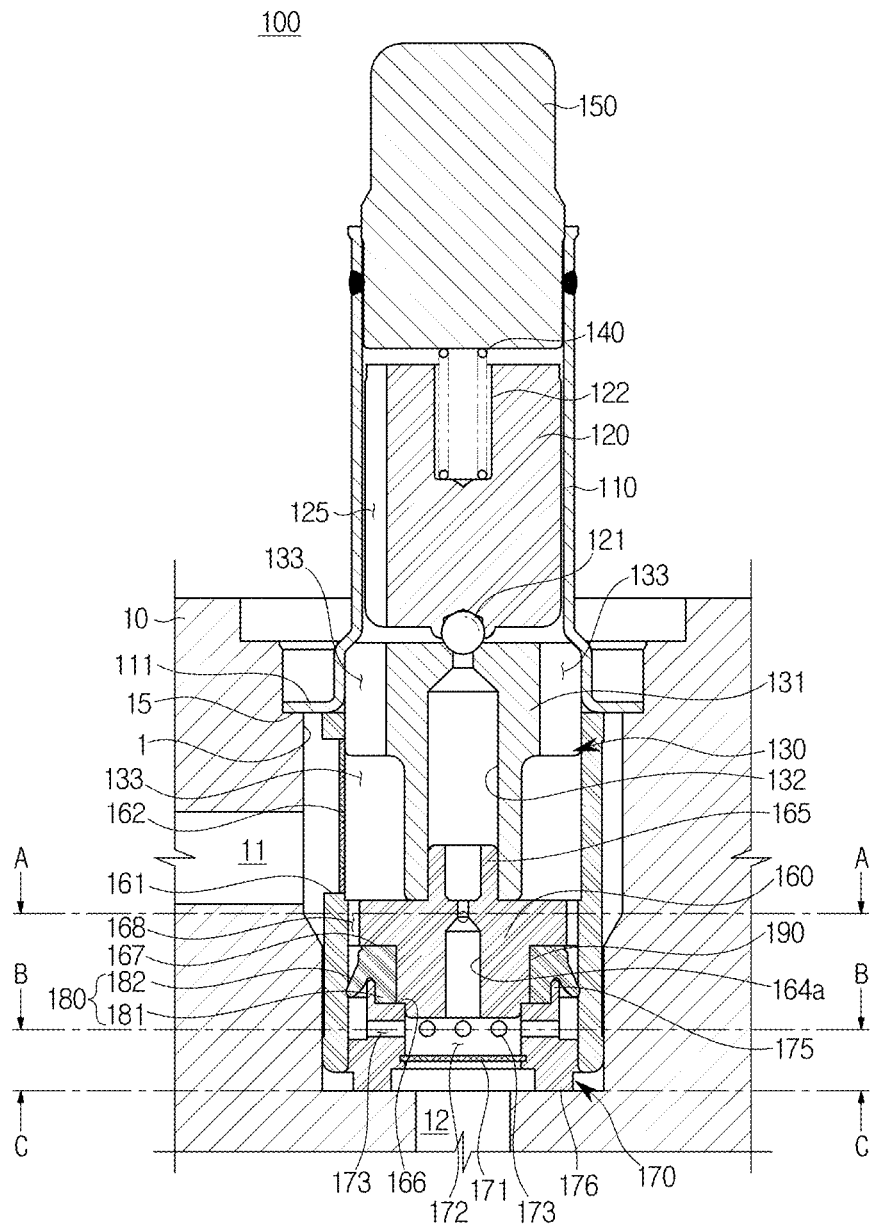
[FIG 1]

[ FIG. 2a ]
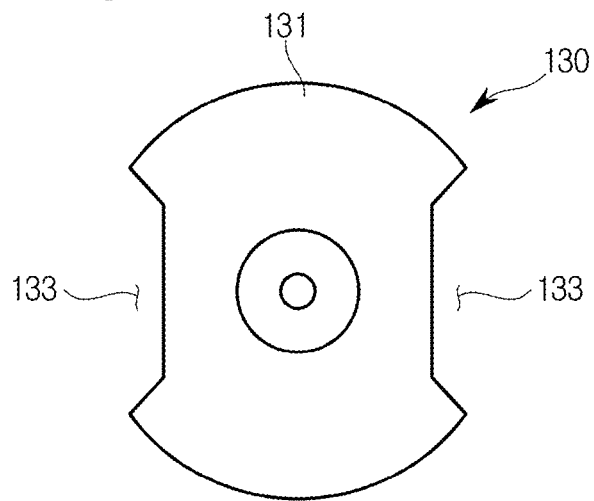
[ FIG. 2b ]
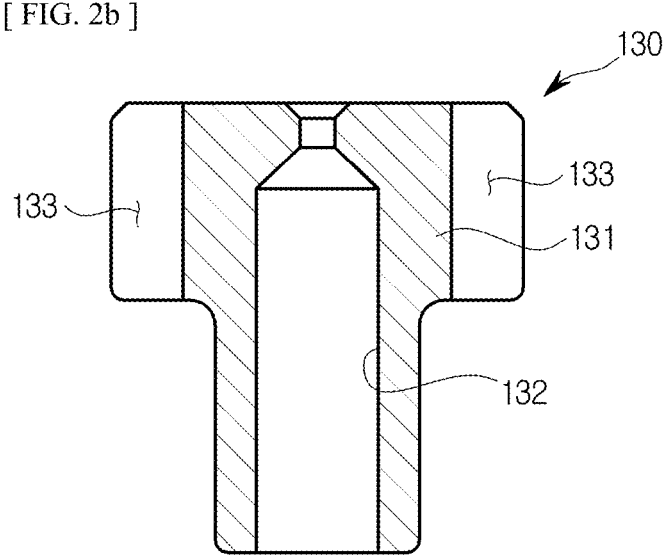

【FIG 3】
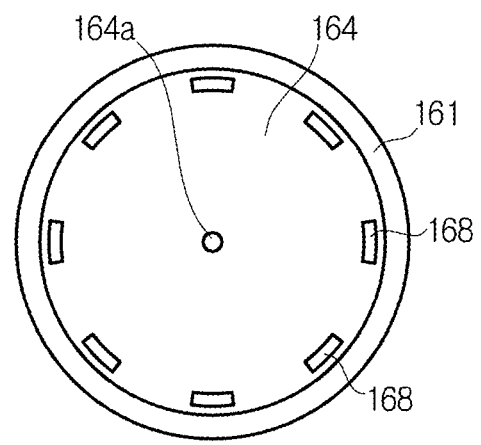
【FIG 4】
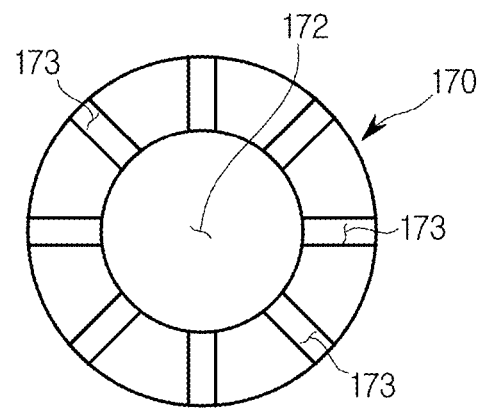

[FIG 5]
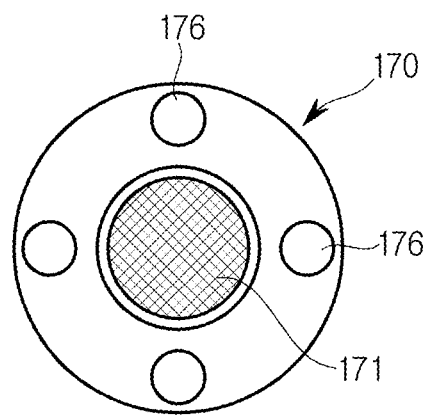

[FIG 6]
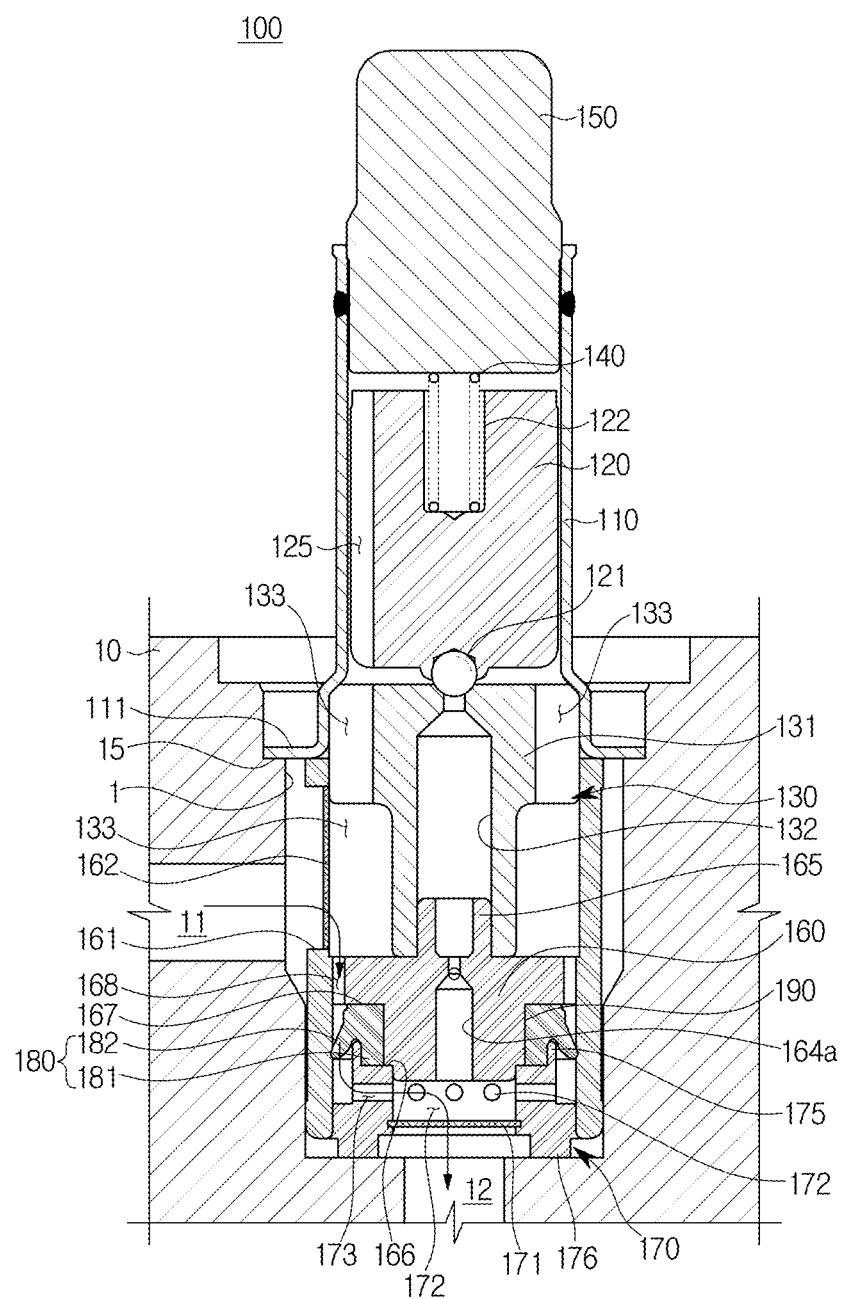

[FIG 7]
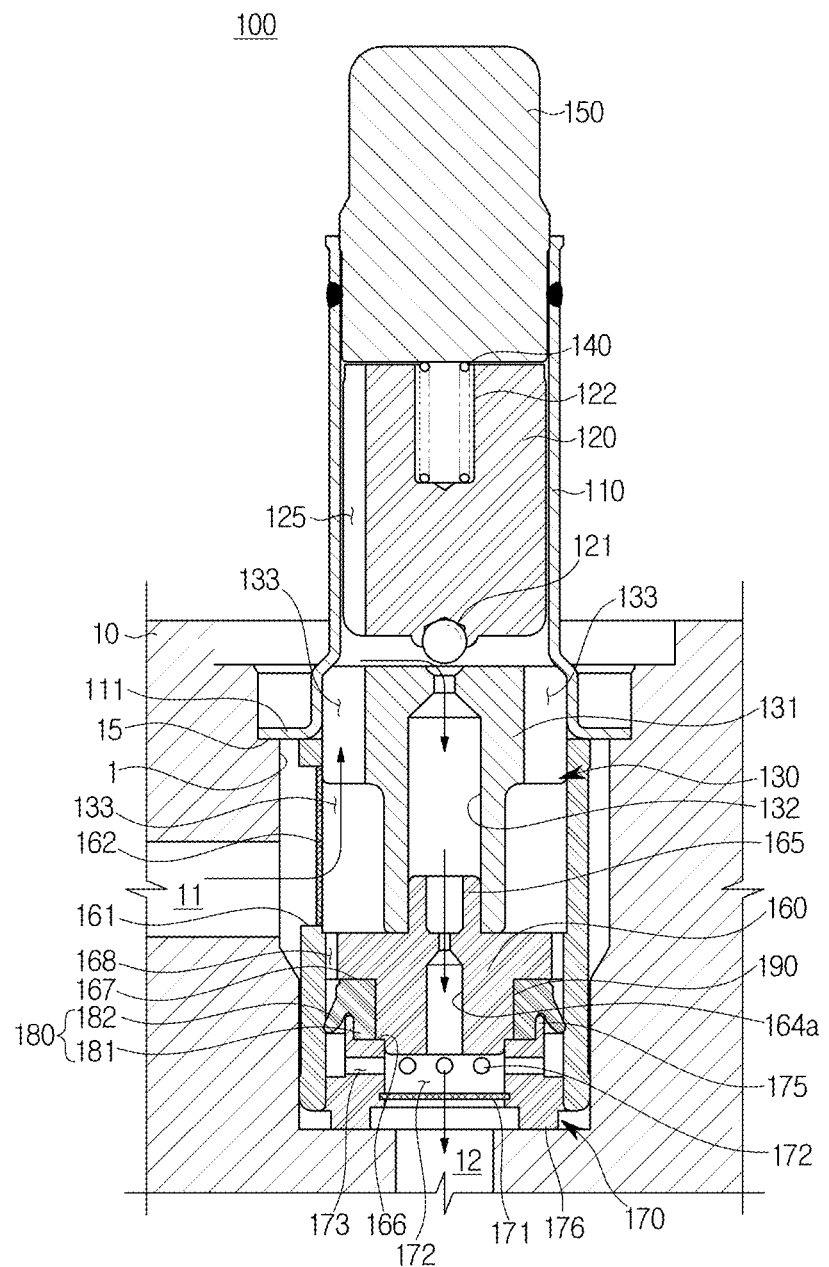

[FIG 8]
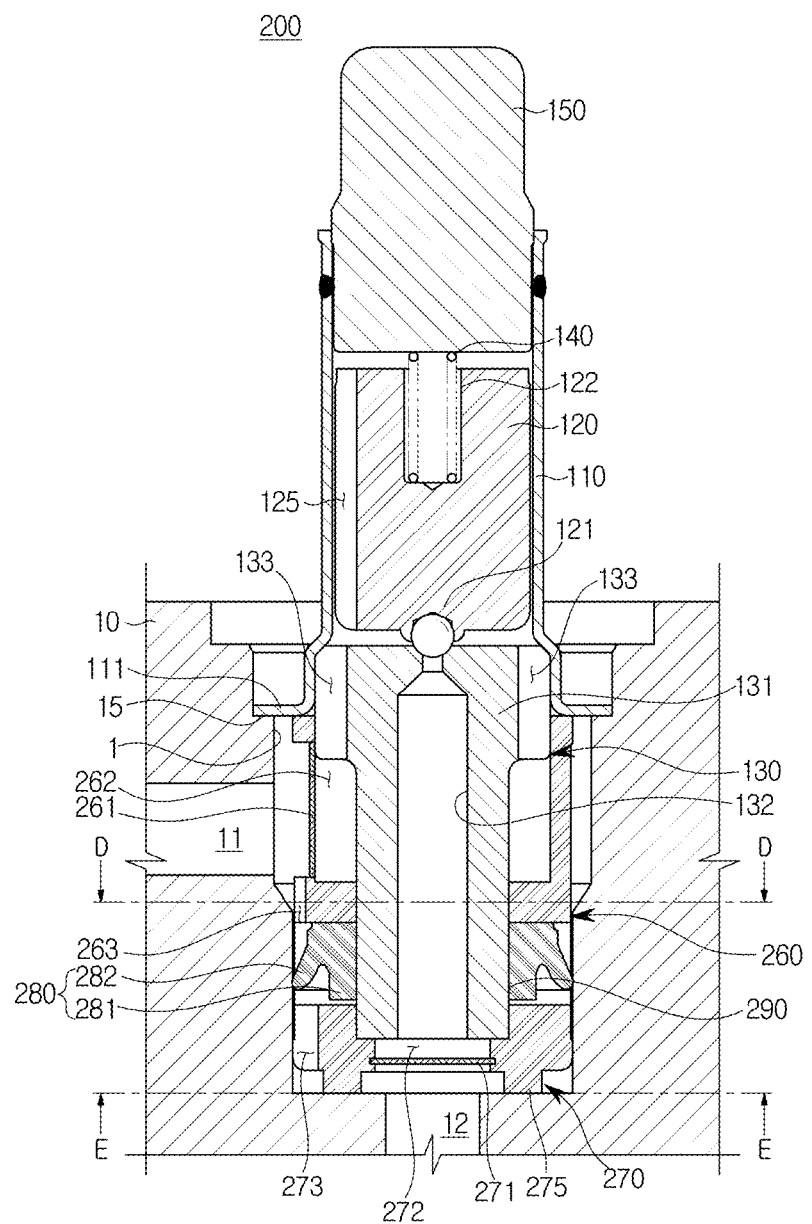

[FIG 9]
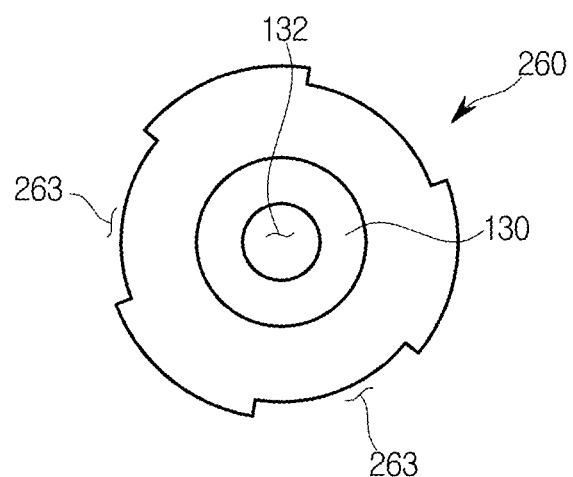
[FIG 10]
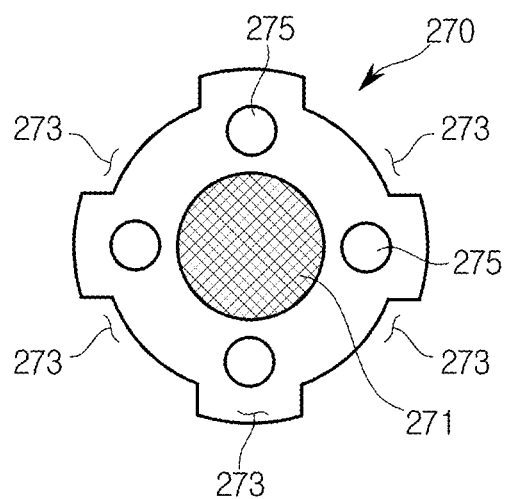

[FIG 11]
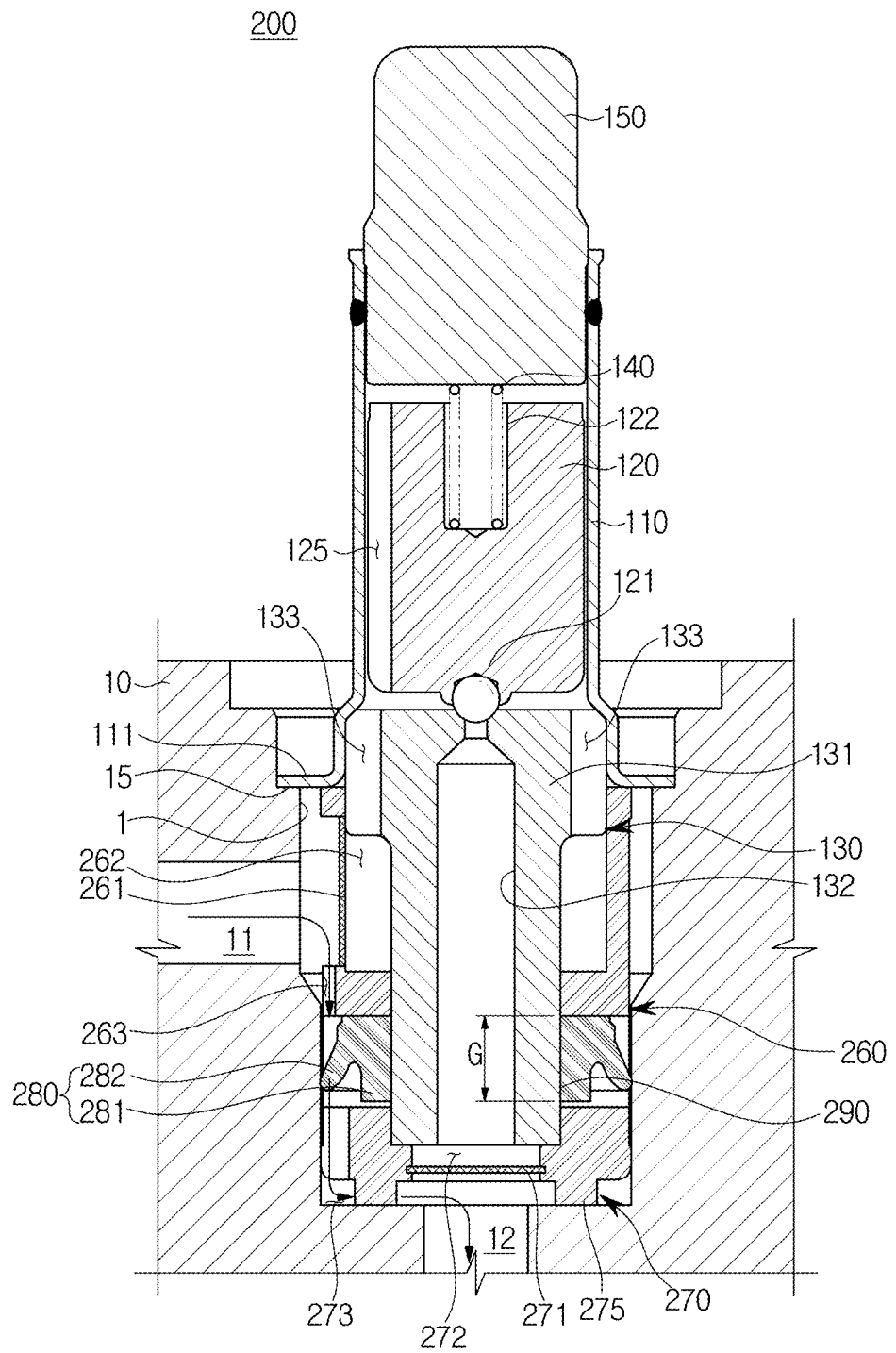

[FIG 12]
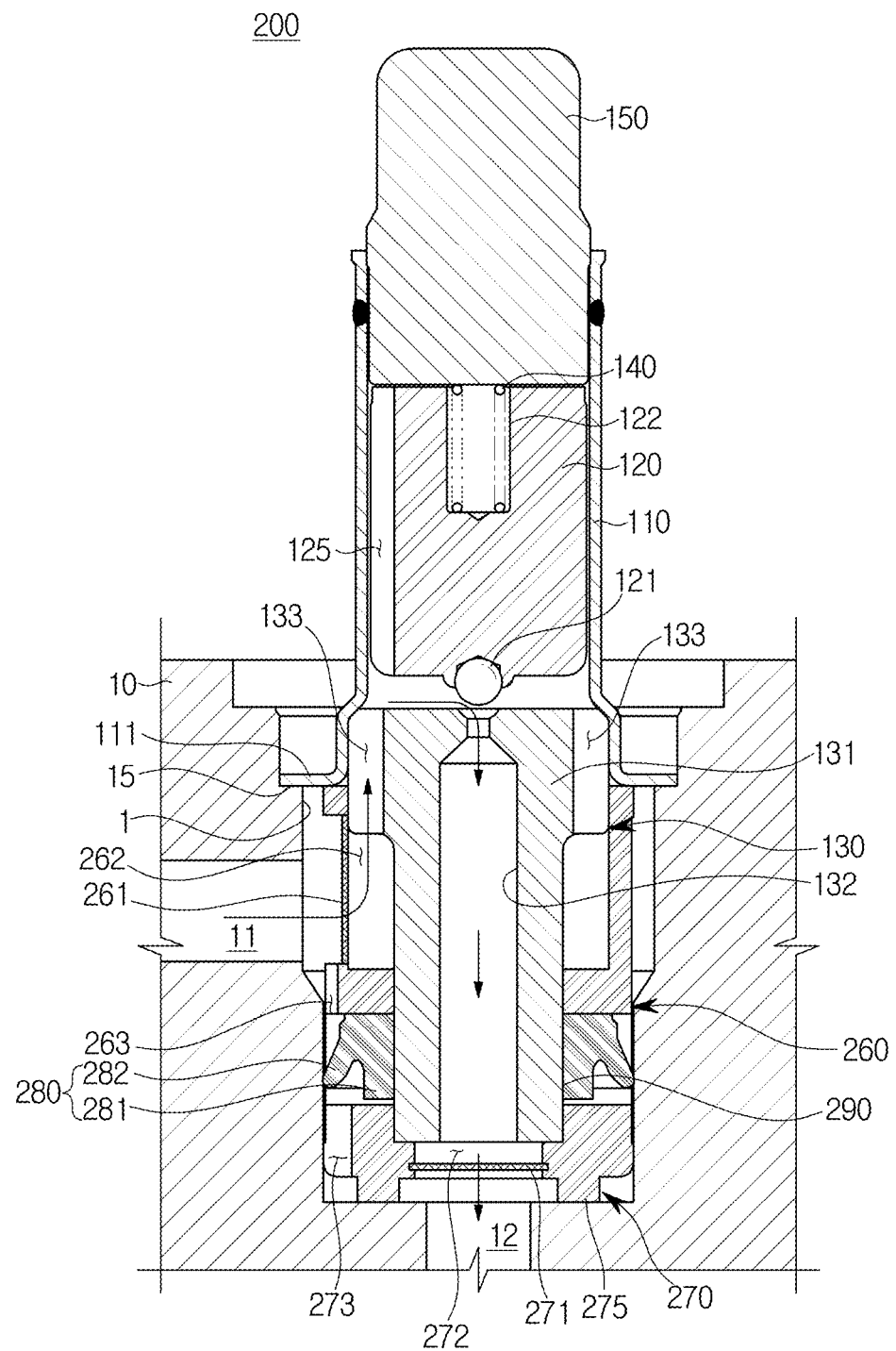

[FIG 13]
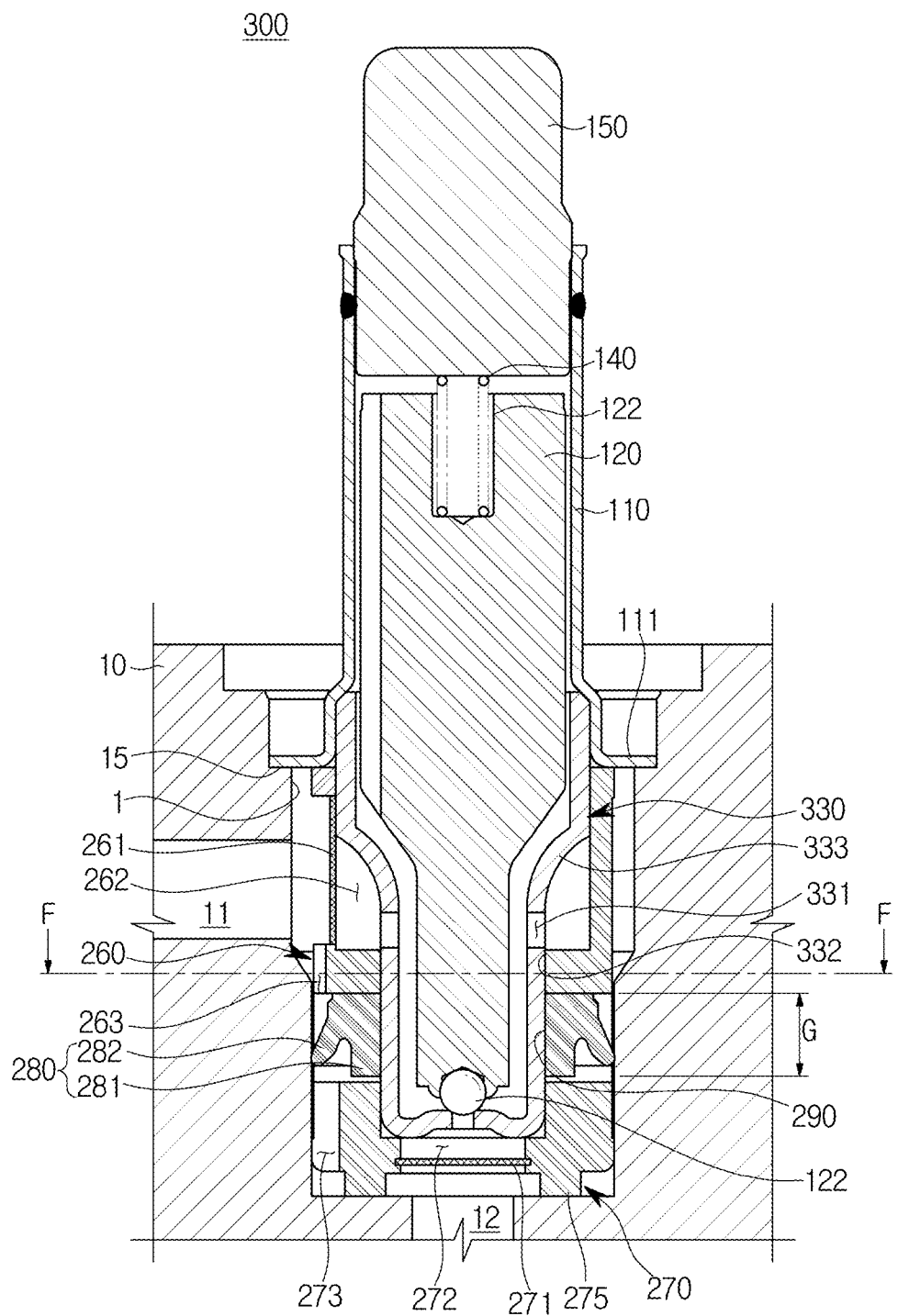

[FIG 14]
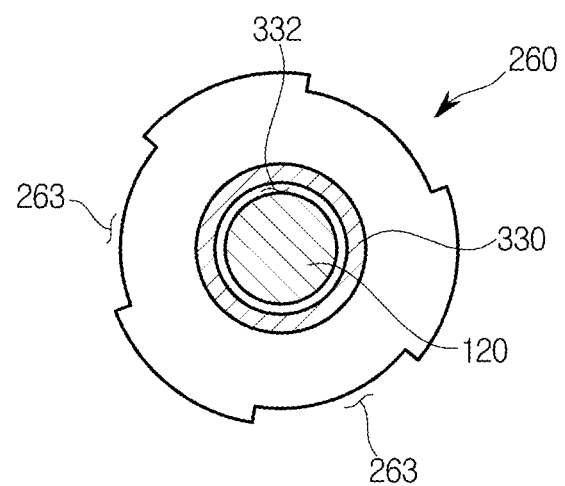

[FIG 15]
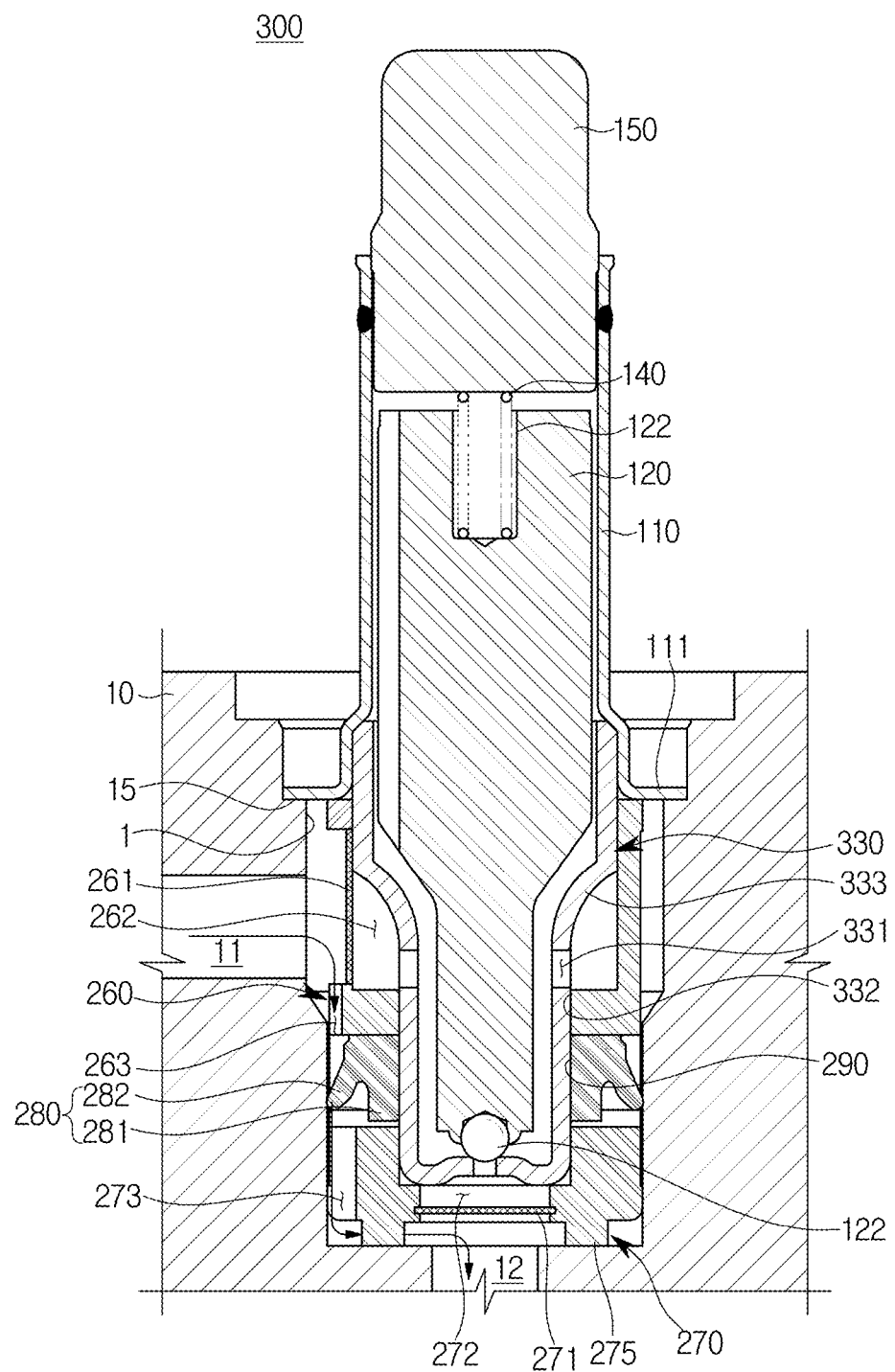

[FIG 16]
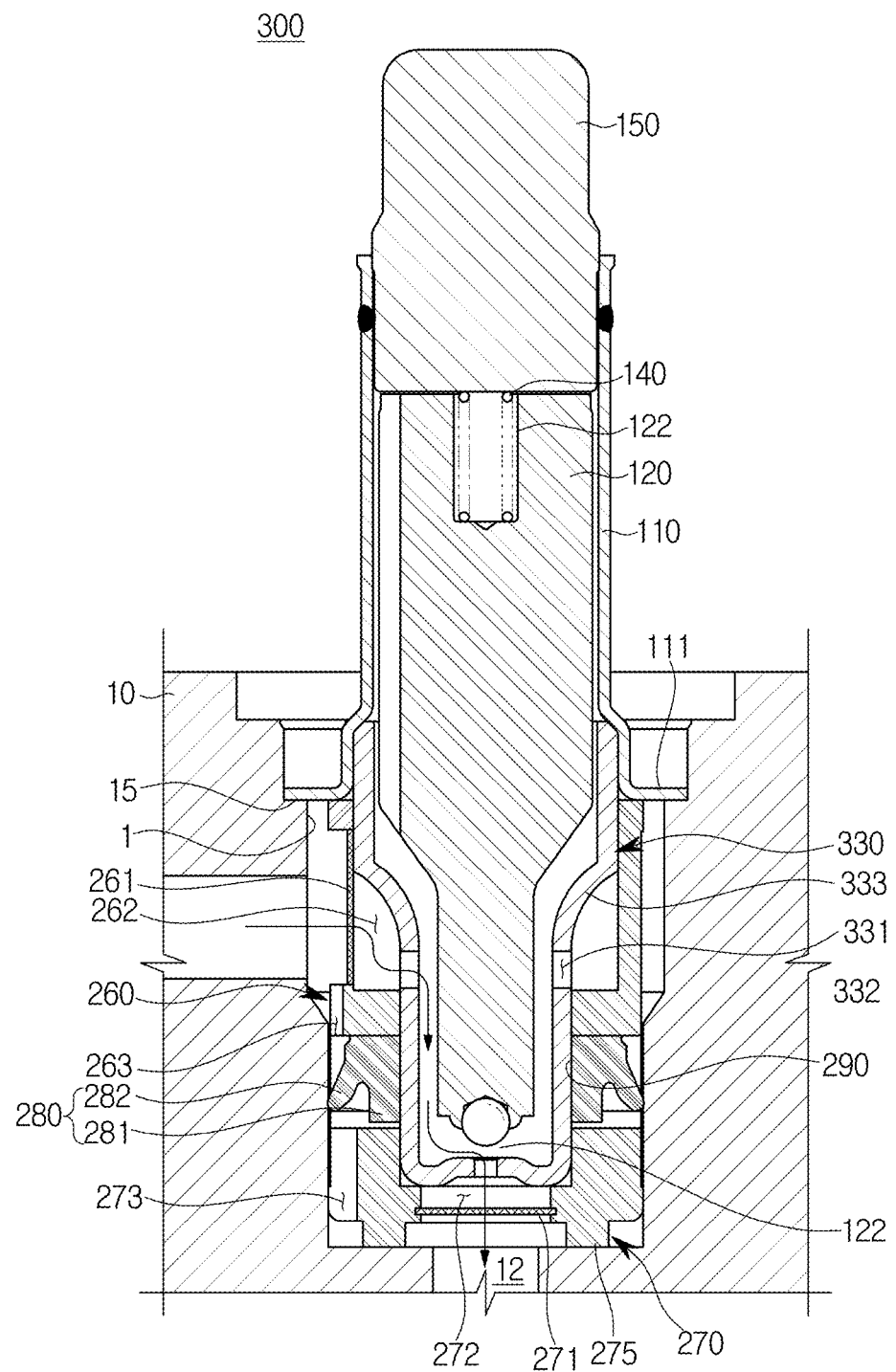

SOLENOID VALVE

CROSS-REFERENCE TO RELATED APPLICATION(S)

This application is based on and claims priority under 35 U.S.C. § 119 to Korean Patent Application No. 10-2018-0029908, filed on Mar. 14, 2018 in the Korean Intellectual Property Office, the disclosure of which is incorporated by reference herein in its entirety.

BACKGROUND

1. Technical Field

The present disclosure relates to a solenoid valve, and more particularly, to a solenoid valve applicable to an electronic control type brake system.

2. Description of the Related Art

Generally, a brake system is provided to effectively prevent a slip phenomenon of a wheel which may occur when a vehicle is braked, suddenly accelerated or rapidly accelerated. The brake system is installed in a modulator block in which flow passages forming a hydraulic circuit that is provided with a plurality of solenoid valves for controlling braking hydraulic pressure transmitted from a master cylinder to wheel cylinders and a plurality of check valves for preventing the reverse flow of brake oil are formed, to control the braking hydraulic pressure.

Recently, an electronic brake system having a hydraulic pressure supply device, which receives an electric signal corresponding to a braking force of a driver from a pedal displacement sensor that senses displacement of a brake pedal when the driver depresses the brake pedal and supplies a braking pressure to the wheel cylinders, is used. In a typical electronic brake system, the hydraulic pressure supply device receives an electrical signal corresponding to a pressing force applied to the brake pedal and operates the motor to generate a braking pressure. At this time, the braking pressure is generated by converting the rotational motion of the motor into the linear motion of the piston.

A plurality of solenoid valves that are electrically operated to control the flow of brake fluid such as brake oil in opposite directions and a plurality of check valves that control the flow of the brake fluid in one direction are provided in the flow passages formed in the modulator block. As an example, the solenoid valves and the check valves are installed on the flow passages connecting the hydraulic pressure supply device and the wheel cylinders.

Since these solenoid valves and check valves have not only different functions but also different application forms and arrangement structures of the components, when the solenoid valves and the check valves are to be applied together in order to effectively control the flow of the brake fluid, the flow passages should be separately provided, and the solenoid valves and the check valves should be arranged in parallel with each other. However, in this case, since the solenoid valves and the check valves must be provided separately, there are problems in that the manufacturing cost of the brake system is increased and the assemblability and productivity of the product are deteriorated due to the need to expand the flow passages with the increase in the number of valves.

Therefore, it is required to study the solenoid valve so as to improve the assemblability and the productivity of the product by reducing the number of parts, to reduce the manufacturing cost of the product by a simple structure, and to improve the performance and operational reliability of the product.

SUMMARY

It is an aspect of the present disclosure to provide a solenoid valve capable of simultaneously performing the function of a check valve for controlling a unidirectional flow of a brake fluid.

It is an aspect of the present disclosure to provide a solenoid valve capable of stably allowing and blocking the flow of a brake fluid even under various operating environments and driving conditions.

It is an aspect of the present disclosure to provide a solenoid valve having a small number of components and a simple structure to improve assemblability and productivity of a product.

It is an aspect of the present disclosure to provide a solenoid valve capable of reducing manufacturing cost of a product.

It is an aspect of the present disclosure to provide a solenoid valve capable of improving the design freedom of a brake system and at the same time achieving product miniaturization.

Additional aspects of the present disclosure will be set forth in part in the description which follows and, in part, will be obvious from the description, or may be learned by practice of the present disclosure.

In accordance with an aspect of the present disclosure, a solenoid valve which is installed in a bore of a modulator block having a first hydraulic port and a second hydraulic port to control a flow of a braking fluid, may comprise: a sleeve formed to be perforated in an axial direction and including a flange portion fixed to the modulator block; an armature provided to be movable in the axial direction within the sleeve; a valve seat including a head portion coupled to an inner circumferential surface of one end of the sleeve and formed to be expanded in an outer diameter direction, a first orifice formed to be perforated in the axial direction, and a plurality of first slots formed to be recessed in the axial direction on an outer circumferential surface of the head portion; an elastic member provided to press the armature toward the valve seat; a magnet core provided to seal the other end of the sleeve and to separate the armature from the first orifice by an electromagnetic force; a first housing member including a circumferential portion having an inner circumferential surface coupled to the outer circumferential surface of the head portion and an outer circumferential surface coupled to an inner circumferential surface of the bore, a first filter portion provided to filter the foreign matter contained in the brake fluid or to prevent the inflow of foreign matter, a chamber provided to allow the brake fluid that has passed through the first filter portion to pass therethrough and to communicate with the first slots, a central portion provided on an inner side of the circumferential portion and having a second orifice formed to be perforated in the axial direction to communicate with the first orifice, a coupling portion formed to protrude from the central portion toward the valve seat to be inserted into an inner circumferential surface of the first orifice, a first step portion and a second step portion formed to be gradually stepped toward the outside at an end of the central portion facing the second hydraulic port, and a plurality of second slots formed to be perforated in the axial direction between the circumferential portion and the central portion and communicating with the chamber; a second housing member including a second filter portion provided to filter the foreign matter contained in the brake fluid or to prevent the inflow of foreign matter, a third orifice formed to be perforated in the axial direction to communicate with the second orifice, and a plurality of third slots formed to be perforated in a radial direction to communicate the second slots and the third orifice, and coupled to the inner circumferential surface of the circumferential portion and an outer circumferential surface of the first step portion; and a sealing member accommodated in a retainer groove formed by the second step portion and an end of the second housing member and formed to be inclined toward the second hydraulic port.

The sealing member may include a body portion seated in the retainer groove, and a lip portion provided to protrude from the body portion toward the inner circumferential surface of the circumferential portion and to be inclined toward the second hydraulic port.

The second housing member may further include a separation preventing protrusion protruding to be capable of being fitted between the body portion and the lip portion.

The second housing member may further include at least one gap forming protrusion protruding from an end of the second housing member facing the second hydraulic port so as to form a gap with the bore.

The armature may include an opening and closing member to open and close the first orifice and a seating portion to receive at least a portion of the elastic member.

In accordance with another aspect of the present disclosure, a solenoid valve which is installed in a bore of a modulator block having a first hydraulic port and a second hydraulic port to control a flow of a braking fluid, may comprise: a sleeve formed to be perforated in an axial direction and including a flange portion fixed to the modulator block; an armature provided to be movable in the axial direction within the sleeve; a valve seat including a head portion coupled to an inner circumferential surface of one end of the sleeve and formed to be expanded in an outer diameter direction, a first orifice formed to be perforated in the axial direction, and a plurality of first slots formed to be recessed in the axial direction on an outer circumferential surface of the head portion; an elastic member provided to press the armature toward the valve seat; a magnet core provided to seal the other end of the sleeve and to separate the armature from the first orifice by an electromagnetic force; a first housing member including a first filter portion provided to filter the foreign matter contained in the brake fluid or to prevent the inflow of foreign matter, a chamber provided to allow the brake fluid that has passed through the first filter portion to pass therethrough and to communicate with the first slots, and a plurality of second slots formed to be recessed in the axial direction on an outer circumferential surface thereof, an inner circumferential surface of the first housing member being coupled to an outer circumferential surface of the valve seat; a second housing member including a second filter portion provided to filter the foreign matter contained in the brake fluid or to prevent the inflow of foreign matter, a second orifice formed to be perforated in the axial direction to communicate with the first orifice, a plurality of third slots formed to be recessed in the axial direction on an outer circumferential surface thereof to communicate with the second slots, and at least one gap forming protrusion protruding from an end of the second housing member facing the second hydraulic port so as to form a gap with the bore, and coupled to an end of the valve seat facing the second hydraulic port in a state of being spaced apart from the first housing member; and a sealing member accommodated in a retainer groove formed by the gap and the outer circumferential surface of the valve seat and formed to be inclined toward the second hydraulic port.

The sealing member may include a body portion seated in the retainer groove, and a lip portion provided to protrude from the body portion toward an inner circumferential surface of the bore and to be inclined toward the second hydraulic port.

The armature may include an opening and closing member to open and close the first orifice and a seating portion to receive at least a portion of the elastic member.

In accordance with another aspect of the present disclosure, a solenoid valve which is installed in a bore of a modulator block having a first hydraulic port and a second hydraulic port to control a flow of a braking fluid, may comprise: a sleeve formed to be perforated in an axial direction and including a flange portion fixed to the modulator block; an armature provided to be movable in the axial direction within the sleeve; a valve seat formed in a hollow shape and having one end coupled to an inner circumferential surface of one end of the sleeve, the valve seat including a plurality of first slots formed to be perforated in a radial direction on a side surface of the valve seat to communicate the inside of the valve seat and the outside of the valve seat, and a first orifice formed to be perforated in the axial direction on an end of the valve seat facing the second hydraulic port to communicate the inside of the valve seat and the outside of the valve seat; an elastic member provided to press the armature toward the valve seat; a magnet core provided to seal the other end of the sleeve and to separate the armature from the first orifice by an electromagnetic force; a first housing member including a first filter portion provided to filter the foreign matter contained in the brake fluid or to prevent the inflow of foreign matter, a chamber provided to allow the brake fluid that has passed through the first filter portion to pass therethrough and to communicate with the first slots, and a plurality of second slots formed to be recessed in the axial direction on an outer circumferential surface of the first housing member, an inner circumferential surface of the first housing member being coupled to an outer circumferential surface of the valve seat; a second housing member including a second filter portion provided to filter the foreign matter contained in the brake fluid or to prevent the inflow of foreign matter, a second orifice formed to be perforated in the axial direction to communicate with the first orifice, a plurality of third slots formed to be recessed in the axial direction on an outer circumferential surface of the second housing member to communicate with the second slots, and at least one gap forming protrusion protruding from an end of the second housing member facing the second hydraulic port so as to form a gap with the bore, and coupled to an end of the valve seat facing the second hydraulic port in a state of being spaced apart from the first housing member; and a sealing member accommodated in a retainer groove formed by the gap and an the outer circumferential surface of the valve seat and formed to be inclined toward the second hydraulic port.

The sealing member may include a body portion seated in the retainer groove, and a lip portion provided to protrude from the body portion toward an inner circumferential surface of the bore and to be inclined toward the second hydraulic port.

The armature may include an opening and closing member to open and close the first orifice and a seating portion to receive at least a portion of the elastic member.

The valve seat may further include a bent portion formed on the side surface so as to be bent inward.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 1 is a sectional view illustrating a solenoid valve according to a first embodiment of the present disclosure;

FIGS. 2a and 2b are a plan view and a side sectional view of a valve seat according to the first embodiment of the present disclosure, respectively;

FIG. 3 is a sectional view taken along a direction A in FIG. 1;

FIG. 4 is a sectional view taken along a direction B in FIG. 1;

FIG. 5 is a sectional view taken along a direction C in FIG. 1;

FIG. 6 is a sectional view illustrating a state in which the solenoid valve according to the first embodiment of the present disclosure performs a check valve function;

FIG. 7 is a sectional view illustrating an operating state of the solenoid valve according to the first embodiment of the present disclosure;

FIG. 8 is a sectional view illustrating a solenoid valve according to a second embodiment of the present disclosure;

FIG. 9 is a sectional view taken along a direction D in FIG. 8;

FIG. 10 is a sectional view taken along a direction E in FIG. 8;

FIG. 11 is a sectional view illustrating a state in which the solenoid valve according to the second embodiment of the present disclosure performs a check valve function;

FIG. 12 is a sectional view illustrating an operating state of the solenoid valve according to the second embodiment of the present disclosure;

FIG. 13 is a sectional view illustrating a solenoid valve according to a third embodiment of the present disclosure;

FIG. 14 is a sectional view taken along a direction F in FIG. 13;

FIG. 15 is a sectional view illustrating a state in which the solenoid valve according to the third embodiment of the present disclosure performs a check valve function; and FIG. 16 is a sectional view illustrating an operating state of the solenoid valve according to the third embodiment of the present disclosure.

DETAILED DESCRIPTION

Hereinafter, preferred embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments illustrated herein but may be embodied in other forms. The drawings do not illustrate the parts not related to the present disclosure in order to clarify the present disclosure, and the size of the components may be slightly exaggerated to facilitate understanding.

FIG. 1 is a sectional view illustrating a solenoid valve according to a first embodiment of the present disclosure, and FIGS. 2a and 2b are a plan view and a side sectional view of a valve seat according to the first embodiment of the present disclosure, respectively. FIGS. 3 to 5 are a sectional view taken along a direction A, a direction B, and a direction C in FIG. 1, respectively.

Referring to FIGS. 1 to 5, a solenoid valve 100 according to a first embodiment of the present disclosure may be provided to be installed in a bore 1 formed on a modulator block 10 that includes a first hydraulic port 11 to which a brake fluid such as brake oil is supplied and a second hydraulic port 12 through which the introduced brake fluid is discharged. The solenoid valve 100, which is installed in the bore 1 of the modulator block 10, may perform a check valve function which allows only the flow of the brake fluid in one direction from the first hydraulic port 11 toward the second hydraulic port 12 by being closed during non-operation, and may control the flow of the brake fluid from the first hydraulic port 11 toward the second hydraulic port 12 by being opened during operation.

The solenoid valve 100 according to the first embodiment of the present disclosure may include a sleeve 110 formed to be perforated in an axial direction, an armature 120 provided to be movable in the axial direction within the sleeve 110, a valve seat 130 coupled to an inner circumferential surface of a lower end of the sleeve 110 and having a first orifice 132 formed to be perforated in the axial direction and a plurality of first slots 133 formed to be recessed in the axial direction on an outer circumferential surface thereof, an elastic member 140 for pressing the armature 120 toward the valve seat 130, a magnet core 150 for sealing an upper end of the sleeve 110 and separating the armature 120 from the first orifice 132 side by an electromagnetic force, a first housing member 160 coupled to the valve seat 130 and the bore 1 and having a second orifice 164a formed to be perforated in the axial direction and communicating with the first orifice 132 and a plurality of second slots 168 formed to be perforated in the inside in the axial direction and communicating with the inside of the valve seat 130, a second housing member 170 coupled to a lower end of the first housing member 160 and having a third orifice 172 formed to be perforated in the axial direction and communicating with the second orifice 164a and a plurality of third slots 173 formed to be perforated in a radial direction to communicate the second slots 168 and the third orifice 172, and a sealing member 180 disposed between the first housing member 160 and the second housing member 170 to allow only the flow of the brake fluid in one direction.

The sleeve 110 may have a cylindrical shape extending in the axial direction or in a vertical direction based on the drawing, and a flange portion 111 formed to protrude or to be bent in an outer radial direction may be provided at an end of the sleeve 110 or the lower end of the sleeve 110 based on the drawing. A step portion 15 for the sleeve may be provided on an inner circumferential surface of the bore 1 in a stepped manner so that the flange portion 111 of the sleeve 110 is in close contact with the inner circumferential surface of the bore 1.

The armature 120 is provided to be movable in the axial direction or the vertical direction inside the sleeve 110. The armature 120 has a cylindrical shape such that an outer diameter thereof corresponds to an inner diameter of the sleeve 110, and at least one flow passage 125, which is formed to be axially or vertically recessed so that the brake fluid may pass therethrough, may be provided on an outer circumferential surface of the armature 120. An opening and closing member 121 for closing the first orifice 132 by coming into close contact with the first orifice 132 of the valve seat 130, which will be described later, may be provided at a lower end of the armature 120, and a seating portion 122 in which at least a portion of the elastic member 140 elastically supporting the armature 120 is received may be formed to be recessed at an upper end of the armature 120. The opening and closing member 121 may be formed in a ball shape and may be press-fitted into a groove formed at the lower end of the armature 120. The armature 120 may be elastically supported by the elastic member 140, which will be described later, and may be urged toward a lower side or the valve seat 130 side by the elastic force of the elastic member 140, which will be described later, so that the opening and closing member 121 may close the first orifice 132 of the valve seat 130 during normal operation or non-operation. The armature 120 may also open the first orifice 132 by separating the opening and closing member 121 from the first orifice 132 of the valve seat 130 as the armature 120 is lifted by the electromagnetic force of the magnet core 150, which will be described later.

The magnet core 150 may be coupled to the upper end of the sleeve 110 to seal an open upper portion of the sleeve 110 and to raise the armature 120 by an electromagnetic force. An upper end of the elastic member 140 may be supported on a lower end of the magnet core 150. An excitation coil assembly (not shown) that generates a magnetic field by the application of power to move the armature 120 may be provided on the outer side of the magnet core 150 and the sleeve 110. When the excitation coil assembly is energized, the armature 120 may be raised toward the magnet core 150 by the magnetic force acting between the magnet core 150 and the armature 120.

Referring to FIG. 2, the valve seat 130 may include a head portion 131 formed to extend in an outer diameter direction to be coupled to the inner circumferential surface of an lower end side of the sleeve 110, the first orifice 132 formed to be perforated in the axial direction, and the plurality of first slots 133 formed to be recessed in the axial direction on an outer circumferential surface of the head portion 131. The head portion 131 may be formed to extend in the outer diameter direction on an upper side of the valve seat 130 and to have an outer diameter corresponding to the inner diameter of the sleeve 110, so that the head portion 131 may be inserted into and coupled to the inner peripheral surface of the lower end side of the sleeve 110. The first orifice 132 has a central portion formed to be perforated in the vertical direction, and a sheet formed to be inclined corresponding to the shape of the opening and closing member 121 may be provided on an upper end of the first orifice 132. For example, in a case where the opening and closing member 121 is formed in a ball shape as shown in the drawing, the sheet may be formed to be inclined downward so that at least a portion of the opening and closing member 121 may be seated. The plurality of first slots 133 are formed to be recessed or pass through along the axial direction on the outer peripheral surface of the head portion 131 so that the brake fluid introduced from the first hydraulic port 11 may pass through a space between the lower end of the armature 120 and an upper end of the valve seat 130. FIG. 2 illustrates a pair of the first slots 133 formed on opposite sides of the head portion 131, but the present disclosure is not limited thereto. For example, a large number of the first slots 133 may be formed on various positions as long as the brake fluid introduced from a chamber 163 may be supplied to the first orifice 132. In addition, the sleeve 110 may have an extension portion formed at the lower end of the sleeve 110 to extend outwardly corresponding to the outer diameter of the head portion 131 of the valve seat 130 in order to stably couple the sleeve 110 and the valve seat 130.

The elastic member 140 is provided between the armature 120 and the magnet core 150 so as to elastically support the armature 120 toward the valve seat 130. One end of the elastic member 140 may be supported by a lower end surface of the magnet core 150 and the other end may be received in and supported by the seating portion 122 of the armature 120. The armature 120 is urged toward the valve seat 130 by the elastic force of the elastic member 140 during the normal operation or the non-operation so that the opening and closing member 121 of the armature 120 may close the first orifice 132 of the valve seat 130, and when a magnetic force is generated by the application of power, the magnet core 150 compresses the elastic member 140 by lifting the armature 120, so that the opening and closing member 121 of the armature 120 may be opened by being spaced apart from the first orifice 132 of the valve seat 130. The elastic member 140 may be formed of a coil spring or the like, but is not limited to the coil spring. That is, the elastic member 140 may be formed of various materials and structures as long as the armature 120 may be elastically supported.

The first housing member 160 may include a circumferential portion 161 having an inner circumferential surface coupled to the outer circumferential surface of the head portion 131 of the valve seat 130 and an outer circumferential surface coupled to the inner circumferential surface of the bore 1, a first filter portion 162 for filtering foreign matter contained in the brake fluid or preventing the inflow of foreign matter, the chamber 163 provided to allow the brake fluid, which has passed through the first filter portion 162, to pass therethrough and communicating with the first slot 133, a central portion 164 provided on the inner side of the circumferential portion 161 and having the second orifice 164a formed to be perforated in the axial direction and communicating with the first orifice 132, a coupling portion 165 formed to protrude from the central portion 164 toward the valve seat 130 side to be inserted into an inner circumferential surface of the first orifice 132, a first step portion 166 and a second step portion 167 formed to be gradually stepped outward at a lower end of the central portion 164, and the plurality of second slots 168 formed to be perforated in the axial direction between the circumferential portion 161 and the central portion 164 and communicating with the chamber 163.

The circumferential portion 161 may be formed in a cylindrical shape, and the inner circumferential surface of the upper end of the circumferential portion 161 may be coupled to the outer circumferential surface of the head portion 131 of the valve seat 130 and the outer circumferential surface of the lower end of the circumferential portion 161 may be coupled to the inner circumferential surface of the bore 1. The first filter portion 162 may be formed on the upper side of the first housing member 160 and the chamber 163 may be formed on the inner side of the first filter portion 162. A plurality of the first filter portions 162 may be provided on the upper side of the circumferential portion 161 to filter foreign matter contained in the brake fluid introduced from the first hydraulic port 11 or to prevent the inflow of foreign matter, and the first housing member 160 and the first filter portion 162 may be integrally formed by an insert molding process. The chamber 163 is formed by an internal space on the upper side of the first housing member 160. The chamber 163 may be provided to receive the brake fluid from which foreign matter has been removed via the first filter portion 162 and may be provided to communicate with the first slot 133 of the valve seat 130 and the second slots 168 of the first housing member 160.

The central portion 164 may be provided inside a lower side of the circumferential portion 161 may have the second orifice 164a formed to be perforated in the axial direction to communicate with the first orifice 132. The second orifice 164a may be formed to be perforated the central portion 164 in the vertical direction, and an upper portion of the second orifice 164a may communicate with the first orifice 132 and a lower portion of the second orifice 164a may communicate with the third orifice 172 of the second housing member 170, which will be described later. The second orifice 164a may be continuously changed in size of its inner diameter to regulate the flow rate or the hydraulic pressure of the brake fluid. The coupling portion 165 may be provided on the upper surface of the central portion 164 in a hollow cylindrical shape to be coupled with the valve seat 130. To this end, the outer diameter of the coupling portion 165 may be formed to correspond to the inner diameter of the first orifice 132 of the valve seat 130 so that the outer circumferential surface of the coupling portion 165 may be tightly coupled to the inner circumferential surface of the first orifice 132.

The first step portion 166 and the second step portion 167 are formed so as to be stepped toward the outer side at the lower end or the bottom surface of the central portion 164. The second housing member 170, which will be described later, may be coupled to an outer circumferential surface of the first step portion 166, and the second step portion 167 may form a retainer groove 190 together with the inner circumferential surface of the circumferential portion 161 and the upper end of the second housing member 170. A detailed description thereof will be given later. As illustrated in FIG. 3, the plurality of second slots 168 may be axially formed between the circumferential portion 161 and the central portion 164 to communicate the chamber 163 and the third slots 173 of the second housing member 170. Accordingly, the brake fluid introduced into the chamber 163 may be supplied to the third slots 173 side of the second housing member 170 through the second slots 168.

The second housing member 170 may include a second filter portion 171 for filtering foreign matter contained in the brake fluid or preventing the inflow of foreign matter, the third orifice 172 formed to be perforated in the axial direction to communicate with the second orifice 164a, the plurality of third slots 173 formed to be perforated in the radial direction to communicate the second slots 168 and the third orifice 172, and at least one gap forming protrusion 176 protruding from a lower end thereof to form a gap with the bore 1.

The second housing member 170 may be provided to be coupled to the inner circumferential surface of the circumferential portion 161 and the outer circumferential surface of the first step portion 166. To this end, the outer diameter of the second housing member 170 may be formed to correspond to the inner diameter of the circumferential portion 161, and the inner diameter of the third orifice 172 formed to be perforated in the axial direction or the vertical direction may be formed to correspond to the outer diameter of the first step portion 166. In addition, the outer diameter of the upper end of the second housing member 170 may be provided to be smaller than the inner diameter of the circumferential portion 161 for communicating the second slots 168 and the third slots 173 as described later. A detailed description thereof will be given later.

The third orifice 172 may be formed to be perforated in the axial direction or in the vertical direction, the first step portion 166 of the first housing member 160 may be inserted into and coupled with the upper end of the third orifice 172, and the third orifice 172 may communicate with the first orifice 132 of the first housing member 160. The second filter portion 171 may be provided at a lower side of the third orifice 172 to filter foreign matter contained in the brake fluid or to prevent the inflow of foreign matter. The second housing member 170 and the second filter portion 171 may be integrally formed by an insert molding process.

As illustrated in FIG. 4, the plurality of third slots 173 may be formed to be perforated in the radial direction to communicate the second slots 168 of the first housing member 160 and the third orifice 172. Also, the outer diameter of the upper portion where the third slot 173 is formed on the second housing member 170 may be provided to be smaller than the inner diameter of the circumferential portion 161 of the first housing member 160 so that the second slots 168 of the first housing member 160 and the third slots 173 of the second housing member 170 may communicate with each other. That is, a gap for passage of the brake fluid may be formed between the outer circumferential surface of the upper portion of the second housing member 170 and the inner circumferential surface of the circumferential portion 161 of the first housing member 160.

The gap forming protrusion 176 may be formed at the lower end of the second housing member 170 to form a gap between the second housing member 170 and the bore 1. As the gap is formed between the second housing member 170 and an end surface of the bore 1 in which the second hydraulic port 12 is formed by the gap forming protrusion 176, a flow passage for stably passing the brake fluid may be formed. As illustrated in FIG. 5, a plurality of the gap forming protrusions 176 may be formed to protrude radially from the lower end of the second housing member 170, but the number and position of the gap forming protrusions 176 may vary.

The sealing member 180 may be disposed in the retainer groove 190 formed by the second step portion 167 of the first housing member 160 and the upper end of the second housing member 170 and the inner circumferential surface of the circumferential portion 161 of the first housing member 160, so that the flow of the brake fluid from the second slots 168 toward the third slots 173 may be allowed while the flow of the brake fluid in the opposite direction may be blocked. The sealing member 180 may include a body portion 181 seated in the retainer groove 190, and a lip portion 182 that is formed to protrude from the body portion 181 toward the inner circumferential surface of the circumferential portion 161 of the first housing member 160 and provided to be inclined toward the second hydraulic port 12 or downward in order to allow only the flow of the brake fluid from the second slots 168 toward the third slots 173. The lip portion 182 is formed to be inclined toward a direction allowing the flow of the brake fluid, thereby allowing only the flow of the brake fluid in one direction and blocking the flow of the brake fluid in the opposite direction. A detailed description thereof will be given later with reference to FIG. 6.

The second housing member 170 may further include a separation preventing protrusion 175 which is fitted between the body portion 181 of the sealing member 180 and the lip portion 182 so as to prevent the sealing member 180 from being separated. In general, the sealing member 180 is made of a material having elasticity for stable sealing, and the separation preventing protrusion 175 is formed to protrude from the upper end surface of the second housing member 170 and is inserted between the lip portion 182 and the body portion 181, so that the sealing member 180 may be stably inserted into the retainer groove 190 and may be prevented from being separated from the retainer groove 190.

Hereinafter, a check valve function of the solenoid valve 100 according to the first embodiment of the present disclosure will be described.

FIG. 6 is a sectional view illustrating a state in which the solenoid valve according to the first embodiment of the present disclosure performs a check valve function.

Referring to FIG. 6, since the armature 120 is elastically supported by the elastic member 140 when the solenoid valve 100 according to the first embodiment of the present disclosure is not operated, the opening and closing member 121 of the armature 120 is brought into close contact with the seat of the valve seat 130 so that the first orifice 132 is closed. However, the solenoid valve 100 may perform the check valve function that allows only the flow of the brake fluid in one direction from the first hydraulic port 11 toward the second hydraulic port 12 even when not operating.

The brake fluid introduced from the first hydraulic port 11 may be supplied to the chamber 163 in a state where the foreign matter is filtered through the first filter portion 162 of the first housing member 160, arid the brake fluid introduced into the chamber 163 may be supplied to the third slots 173 through the second slots 168. At this time, as the lip portion 182 is formed to be inclined in a direction allowing the flow of the brake fluid, that is, as the lip portion 182 is formed to be inclined toward the lower side where the third slots 173 are formed, the lip portion 182 is bent inward by the fluid pressure of the brake fluid introduced from the second slots 168, and thus the sealing member 180 disposed between the second slots 168 and the third slots 173 may allow the flow of the brake fluid toward the third slots 173. The brake fluid supplied to the third slots 173 may be discharged to the second hydraulic port 12 through the third orifice 172 and the second filter portion 171.

Meanwhile, in a case where the brake fluid is introduced from the second hydraulic port 12 and flows into the second slots 168 through the third orifice 172 and the third slots 173 during operation of the brake system to which the modulator block 10 is applied, since the lip portion 182 of the sealing member 180 is expanded outward by the fluid pressure of the brake fluid and is brought into close contact with the inner circumferential surface of the circumferential portion 161 of the first housing member 160, the flow of the brake fluid from the third slots 173 toward the second slots 168 may be blocked.

Hereinafter, the operation of the solenoid valve 100 according to the first embodiment of the present disclosure will be described.

FIG. 7 is a sectional view illustrating an operating state of the solenoid valve according to the first embodiment of the present disclosure. Referring to FIG. 7, when an electric signal is transmitted and power is applied to the excitation coil assembly (not shown), a magnetic force acts between the magnet core 150 and the armature 120 and an attractive force acts between the magnet core 150 and the armature 120 due to the magnetic force. When the attractive force for raising the armature 120 is larger than the elastic force of the elastic member 140, the armature 120 moves while compressing the elastic member 140. Accordingly, the opening and closing member 121 of the armature 120 and the first orifice 132 of the valve seat 130 may be separated from each other to open the first orifice 132, and the brake fluid introduced from the first hydraulic port 11 may be supplied to the first orifice 132 through the first filter portion 162, the chamber 163 and the first slot 133. The brake fluid supplied to the first orifice 132 may be discharged to the second hydraulic port 12 through the second orifice 164a, the third orifice 172 and the second filter portion 171.

Thereafter, when the power is turned off, as the magnetic force and attractive force between the magnet core 150 and the armature 120 disappear, the force for raising the armature 120 disappears, the armature 120 is returned to its original position by the elastic restoring force of the elastic member 140, and the opening and closing member 121 of the armature 120 and the first orifice 132 of the valve seat 130 are in close contact with each other so that the first orifice 132 may be closed and the flow of the brake fluid may be blocked.

Hereinafter, a solenoid valve according to a second embodiment of the present disclosure will be described.

FIG. 8 is a sectional view illustrating the solenoid valve according to a second embodiment of the present disclosure, and FIGS. 9 and 10 are a sectional view taken along a direction D and a sectional view taken along a direction E in FIG. 8, respectively.

Referring to FIGS. 8 to 10, a solenoid valve 200 according to a second embodiment of the present disclosure may be provided to be installed in the bore 1 formed on a modulator block 10 that includes the first hydraulic port 11 to which a brake fluid such as brake oil is supplied and the second hydraulic port 12 through which the introduced brake fluid is discharged. The solenoid valve 200, which is installed in the bore 1 of the modulator block 10, may perform a check valve function which allows only the flow of the brake fluid in one direction from the first hydraulic port 11 toward the second hydraulic port 12 by being closed during non-operation, and may control the flow of the brake fluid from the first hydraulic port 11 toward the second hydraulic port 12 by being opened during operation.

The solenoid valve 200 according to the second embodiment of the present disclosure may include the sleeve 110 formed to be perforated in the axial direction, the armature 120 provided to be movable in the axial direction within the sleeve 110, the valve seat 130 coupled to the inner circumferential surface of the lower end of the sleeve 110 and having the first orifice 132 formed to be perforated in the axial direction and the plurality of first slots 133 formed to be recessed in the axial direction on the outer circumferential surface thereof, the elastic member 140 for pressing the armature 120 toward the valve seat 130, the magnet core 150 for sealing the upper end of the sleeve 110 and separating the armature 120 from the first orifice 132 side by an electromagnetic force, a first housing member 260 that filters the foreign matter contained in the brake fluid introduced from the first hydraulic port 11 or prevents the inflow of foreign matter and receives the filtered brake fluid, and has a chamber 262 communicating with the first slot 133 and a plurality of second slots 263 formed to be axially recessed on an outer circumferential surface thereof, a second housing member 270 that filters the foreign matter contained in the brake fluid or prevents the inflow of foreign matter and has a second orifice 272 communicating with the first orifice 132 and a plurality of third slots 273 formed to be axially recessed on an outer circumferential surface thereof, and a sealing member 280 disposed between the first housing member 260 and the second housing member 270 to allow only the flow of the brake fluid in one direction.

The solenoid valve 200 according to the second embodiment of the present disclosure that will be described below is the same as the solenoid valve 100 according to the first embodiment of the present disclosure excepting as additionally described with different reference numerals, and therefore the description thereof is omitted in order to prevent duplication of contents.

The first housing member 260 may include a first filter portion 261 for filtering the foreign matter contained in the brake fluid introduced from the first hydraulic port 11 or preventing the inflow of foreign matter, the chamber 262 provided to allow the brake fluid, which has passed through the first filter portion 261, to pass therethrough and communicating with the first slot 133, and the plurality of second slots 263 formed to be axially recessed on the outer circumferential surface thereof.

The first housing member 260 may have an inner diameter corresponding to the outer diameter of the head portion 131 of the valve seat 130 so as to be coupled to the outer circumferential surface of the valve seat 130. Also, the first housing member 260 may have an outer diameter corresponding to the inner diameter of the bore 1 so as to be supported on the inner circumferential surface of the bore 1. The first housing member 260 may be formed in a hollow cylindrical shape, an upper end of the first housing member 260 may be coupled to the outer circumferential surface of the head portion 131 of the valve seat 130, a first filter unit 261 may be provided on a side surface of the first housing member 260, and a lower end of the first housing member 260 may be coupled to the outer circumferential surface of the valve seat 130.

The first filter portion 261 may be formed on the side surface of the first housing member 260 and the chamber 262 may be formed on the inner side of the first filter portion 261. A plurality of the first filter portions 261 may be provided on the side surface of the first housing member 260 so as to filter the foreign matter contained in the brake fluid introduced from the first hydraulic port 11 or to prevent the inflow of foreign matter, and the first housing member 260 and the first filter portions 261 may be integrally formed by an insert molding process. The chamber 262 is formed by an internal space of the first housing member 260. The chamber 262 may be provided to be capable of receiving the brake fluid from which foreign matter has been removed via the first filter portions 261 and may be provided to be capable of communicating with the first slot 133 of the valve seat 130.

As illustrated in FIG. 9, the plurality of second slots 263 may be formed to be recessed along the axial direction on the outer circumferential surface of the first filter portions 261. The second slots 263 may allow the brake fluid introduced from the first hydraulic port 11 to pass through a space between the second slots 263 and the inner circumferential surface of the bore 1 and to flow into the sealing member 280, which will be described later, and the second housing member 270, so that the solenoid valve 200 may perform a check valve function. A detailed description thereof will be described later.

The second housing member 270 may include a second filter portion 271 for filtering foreign matter contained in the brake fluid or preventing the inflow of foreign matter, the second orifice 272 formed to be perforated in the axial direction at a central portion thereof to communicate with the first orifice 132, a plurality of third slots 373 formed to be recessed in the axial direction at an outer circumferential surface thereof to communicate with the second slots 263, and at least one gap forming protrusion 275 protruding from a lower end thereof to form a gap with the bore 1, and the second housing member 270 is provided to be coupled to the lower end of the valve seat 130 with a predetermined distance from the first housing member 260.

The second housing member 270 may be provided to be coupled to the outer circumferential surface of the lower end of the valve seat 130. To this end, a step portion having an inner diameter corresponding to the outer diameter of the valve seat 130 may be formed on the upper end of the second housing member 270. In addition, the second housing member 270 is coupled to the lower end of the valve seat 130 at the predetermined distance from the first housing member 260 coupled to the valve seat 130, so that a retainer groove 290, which will be described later, may be formed by the distance between the first housing member 260 and the second housing member 270.

The second orifice 272 may be formed to be perforated in the axial or vertical direction to communicate with the first orifice 132 of the valve seat 130. The second filter portion 271 may be provided at a lower side of the second orifice 272 to filter the foreign matter contained in the brake fluid or to prevent the inflow of foreign matter. The second housing member 270 and the second filter portion 271 may be integrally formed by an insert molding process.

As illustrated in FIG. 10, the plurality of third slots 273 may be formed to be recessed in the axial direction on the outer circumferential surface thereof to communicate with the second slots 263 of the first housing member 260. The third slots 273 are connected to a space between the lower end of the second housing member 270 and the bottom surface of the bore 1 so that the brake fluid introduced from the second slots 263 may be discharged to the second hydraulic port 12.

The gap forming protrusion 275 may be formed at the lower end of the second housing member 270 to form the gap between the second housing member 270 and the bore 1. As the gap is formed between the second housing member 270 and an end surface of the bore 1 in which the second hydraulic port 12 is formed by the gap forming protrusion 275, a flow passage for stably passing the brake fluid introduced from the third slots 273 may be formed. As illustrated in FIG. 10, a plurality of the gap forming protrusions 275 may be formed to protrude radially from the lower end of the second housing member 270, but the number and position of the gap forming protrusions 275 may vary.

The sealing member 280 may be disposed in the retainer groove 290 formed by a gap G between the outer circumferential surface of the valve seat 130 and the lower end of the first housing member 260 and the upper end of the second housing member 270, so that the flow of the brake fluid from the second slots 263 toward the third slots 273 may be allowed while the flow of the brake fluid in the opposite direction may be blocked. The sealing member 280 may include a body portion 281 seated in the retainer groove 290, and a lip portion 282 that is formed to protrude from the body portion 281 toward the inner circumferential surface of the bore 1 and provided to be inclined toward the second hydraulic port 12 or downward in order to allow only the flow of the brake fluid from the second slots 263 toward the third slots 273. The lip portion 282 is formed to be inclined toward a direction allowing the flow of the brake fluid, thereby allowing only the flow of the brake fluid in one direction and blocking the flow of the brake fluid in the opposite direction. A detailed description thereof will be given later with reference to FIG. 11.

Hereinafter, a check valve function of the solenoid valve 200 according to the second embodiment of the present disclosure will be described.

FIG. 11 is a sectional view illustrating a state in which the solenoid valve according to the second embodiment of the present disclosure performs a check valve function.

Referring to FIG. 11, since the armature 120 is elastically supported by the elastic member 140 when the solenoid valve 200 according to the second embodiment of the present disclosure is not operated, the opening and closing member 121 of the armature 120 is brought into close contact with the seat of the valve seat 130 so that the first orifice 132 is closed. However, the solenoid valve 200 may perform the check valve function that allows only the flow of the brake fluid in one direction from the first hydraulic port 11 toward the second hydraulic port 12 even when not operating.

The brake fluid introduced from the first hydraulic port 11 may be supplied to the retainer groove 290 side through the second slots 263 formed on the outer circumferential surface of the first housing member 260. At this time, as the lip portion 282 is formed to be inclined in a direction allowing the flow of the brake fluid, that is, as the lip portion 282 is formed to be inclined toward the lower side where the third slots 273 are formed, the lip portion 282 is bent inward by the fluid pressure of the brake fluid introduced from the second slots 263, and thus the sealing member 280 disposed between the first housing member 260 and the second housing member 270 may allow the flow of the brake fluid toward the second slots 273. The brake fluid supplied to the third slots 273 may be discharged to the second hydraulic port 12 through the flow passage between the lower end of the second housing member 270 and the bottom surface of the bore 1.

Meanwhile, in a case where the brake fluid is introduced from the second hydraulic port 12 and flows into the second slots 263 through the flow passage between the lower end of the second housing member 270 and the bottom surface of the bore 1 and the third slots 273 during operation of the brake system to which the modulator block 10 is applied, since the lip portion 282 of the sealing member 280 is expanded outward by the fluid pressure of the brake fluid and is brought into close contact with the inner circumferential surface of the bore 1, the flow of the brake fluid from the third slots 273 toward the second slots 263 may be blocked.

Hereinafter, the operation of the solenoid valve 200 according to the second embodiment of the present disclosure will be described.

FIG. 12 is a sectional view illustrating an operating state of the solenoid valve according to the second embodiment of the present disclosure. Referring to FIG. 12, when an electric signal is transmitted and power is applied to the excitation coil assembly (not shown), a magnetic force acts between the magnet core 150 and the armature 120 and an attractive force acts between the magnet core 150 and the armature 120 due to the magnetic force. When the attractive force for raising the armature 120 is larger than the elastic force of the elastic member 140, the armature 120 moves while compressing the elastic member 140. Accordingly, the opening and closing member 121 of the armature 120 and the first orifice 132 of the valve seat 130 may be separated from each other to open the first orifice 132, and the brake fluid introduced from the first hydraulic port 11 may be supplied to the first orifice 132 through the first filter portion 261, the chamber 262 and the first slot 133. The brake fluid supplied to the first orifice 132 may be discharged to the second hydraulic port 12 through the second orifice 272 and the second filter portion 271.

Thereafter, when the power is turned off, as the magnetic force and attractive force between the magnet core 150 and the armature 120 disappear, the force for raising the armature 120 disappears, the armature 120 is returned to its original position by the elastic restoring force of the elastic member 140, and the opening and closing member 121 of the armature 120 and the first orifice 132 of the valve seat 130 are in close contact with each other so that the first orifice 132 may be closed and the flow of the brake fluid may be blocked.

Hereinafter, a solenoid valve according to a third embodiment of the present disclosure will be described.

FIG. 13 is a sectional view illustrating a solenoid valve according to a third embodiment of the present disclosure, and FIG. 14 is a sectional view taken along a direction F in FIG. 13.

Referring to FIGS. 13 and 14, a solenoid valve 300 according to a third embodiment of the present disclosure may be provided to be installed in the bore 1 formed on a modulator block 10 that includes the first hydraulic port 11 to which a brake fluid such as brake oil is supplied and the second hydraulic port 12 through which the introduced brake fluid is discharged. The solenoid valve 300, which is installed in the bore 1 of the modulator block 10, may perform a check valve function which allows only the flow of the brake fluid in one direction from the first hydraulic port 11 toward the second hydraulic port 12 by being closed during non-operation, and may control the flow of the brake fluid from the first hydraulic port 11 toward the second hydraulic port 12 by being opened during operation.

The solenoid valve 300 according to the third embodiment of the present disclosure may include the sleeve 110 formed to be perforated in the axial direction, the armature 120 provided to be movable in the axial direction within the sleeve 110, the valve seat 130 provided in an hollow shape to be coupled to the inner circumferential surface of the lower end of the sleeve 110 and having a plurality of first slots 331 formed to be perforated in the radial direction at a side portion thereof and a first orifice 332 formed to be perforated in the axial direction at a lower end thereof, the elastic member 140 for pressing the armature 120 toward the valve seat 130, the magnet core 150 for sealing the upper end of the sleeve 110 and separating the armature 120 from the first orifice 332 side by an electromagnetic force, the first housing member 260 that filters the foreign matter contained in the brake fluid introduced from the first hydraulic port 11 or prevents the inflow of foreign matter and receives the filtered brake fluid, and has the chamber 262 communicating with the first slots 331 and the plurality of second slots 263 formed to be axially recessed on an outer circumferential surface thereof, the second housing member 270 that filters the foreign matter contained in the brake fluid or prevents the inflow of foreign matter and has the second orifice 272 formed to be perforated in the axial direction and communicating with the first orifice 332 and the plurality of third slots 273 formed to be axially recessed on an outer circumferential surface thereof, and the sealing member 280 disposed between the first housing member 260 and the second housing member 270 to allow only the flow of the brake fluid in one direction.

The solenoid valve 300 according to the third embodiment of the present disclosure described below is the same as the first and second solenoid valves 100 and 200 according to the first and second embodiments of the present disclosure excepting as additionally described with different reference numerals, and therefore the description thereof is omitted in order to prevent duplication of contents.

The valve seat 330 may be formed in a hollow cylindrical shape and may include a plurality of first slots 331 formed in a radial direction on a side surface so that the inside and the outside communicate with each other, and a first orifice 332 formed to be perforated in the axial direction on a lower end, which is the end of the second hydraulic port 12, so that the inside and the outside communicate with each other. An outer circumferential surface of the valve seat 330 may be inserted into and coupled to the inner circumferential surface of the lower end of the sleeve 110, and a bent portion 333 formed to be bent inward may be provided on the side surface of the valve seat 330.

The plurality of first slots 331 may be formed to be perforated in the radial direction on the side surface of the valve seat 330 so that the inside and the outside, that is, the inside of the valve seat 330 and the chamber 262 of the first housing member 260, which will be described later, communicate with each other, and the first orifice 332 may be formed to be perforated on the center of the lower end of the valve seat 330 so that the opening and closing member 121 of the armature 120 may be brought into close contact with the first orifice 332. The first orifice 332 may communicate with the second orifice 272 of the second housing member 270, which will be described later.

The first housing member 260 may include the first filter portion 261 for filtering the foreign matter contained in the brake fluid introduced from the first hydraulic port 11 or preventing the inflow of foreign matter, the chamber 262 provided to allow the brake fluid, which has passed through the first filter portion 261, to pass therethrough and communicating with the first slot 331, and the plurality of second slots 263 formed to be axially recessed on the outer circumferential surface thereof.

The first housing member 260 may have the inner diameter corresponding to the outer diameter of the valve seat 130 so as to be coupled to the outer circumferential surface of the valve seat 130. Also, the first housing member 260 may have the outer diameter corresponding to the inner diameter of the bore 1 so as to be supported on the inner circumferential surface of the bore 1. The first housing member 260 may be formed in a hollow cylindrical shape, the upper end of the first housing member 260 may be coupled to the outer circumferential surface of the valve seat 130, the first filter unit 261 may be provided on the side surface of the first housing member 260, and the lower end of the first housing member 260 may be coupled to an outer circumferential surface of the bent portion 333 of the valve seat 330.

The first filter portion 261 may be formed on the side surface of the first housing member 260 and the chamber 262 may be formed on the inner side of the first filter portion 261. A plurality of the first filter portions 261 may be provided on the side surface of the first housing member 260 so as to filter the foreign matter contained in the brake fluid introduced from the first hydraulic port 11 or to prevent the inflow of foreign matter, and the first housing member 260 and the first filter portions 261 may be integrally formed by an insert molding process. The chamber 262 is formed by the internal space of the first housing member 260. The chamber 262 may be provided to be capable of receiving the brake fluid from which foreign matter has been removed via the first filter portions 261 and may be provided to be capable of communicating with the first slot 331 of the valve seat 330.

As illustrated in FIG. 14, the plurality of second slots 263 may be formed to be recessed along the axial direction on the outer circumferential surface of the first filter portions 261. The second slots 263 may allow the brake fluid introduced from the first hydraulic port 11 to pass through the space between the second slots 263 and the inner circumferential surface of the bore 1 and to flow into the sealing member 280, which will be described later, and the second housing member 270, so that the solenoid valve 300 may perform a check valve function. A detailed description thereof will be described later.

Hereinafter, a check valve function of the solenoid valve 300 according to the third embodiment of the present disclosure will be described.

FIG. 15 is a sectional view illustrating a state in which the solenoid valve according to the third embodiment of the present disclosure performs a check valve function.

Referring to FIG. 15, since the armature 120 is elastically supported by the elastic member 140 when the solenoid valve 300 according to the third embodiment of the present disclosure is not operated, the opening and closing member 121 of the armature 120 is brought into close contact with the seat of the valve seat 330 so that the first orifice 332 is closed. However, the solenoid valve 300 may perform the check valve function that allows only the flow of the brake fluid in one direction from the first hydraulic port 11 toward the second hydraulic port 12 even when not operating.

The brake fluid introduced from the first hydraulic port 11 may be supplied to the retainer groove 290 side through the second slots 263 formed on the outer circumferential surface of the first housing member 260. At this time, as the lip portion 282 is formed to be inclined in a direction allowing the flow of the brake fluid, that is, as the lip portion 282 is formed to be inclined toward the lower side where the third slots 273 are formed, the lip portion 282 is bent inward by the fluid pressure of the brake fluid introduced from the second slots 263, and thus the sealing member 280 disposed between the first housing member 260 and the second housing member 270 may allow the flow of the brake fluid toward the second slots 273. The brake fluid supplied to the third slots 273 may be discharged to the second hydraulic port 12 through the flow passage between the lower end of the second housing member 270 and the bottom surface of the bore 1.

Meanwhile, in a case where the brake fluid is introduced from the second hydraulic port 12 and flows into the second slots 263 through the flow passage between the lower end of the second housing member 270 and the bottom surface of the bore 1 and the third slots 273 during operation of the brake system to which the modulator block 10 is applied, since the lip portion 282 of the sealing member 280 is expanded outward by the fluid pressure of the brake fluid and is brought into close contact with the inner circumferential surface of the bore 1, the flow of the brake fluid from the third slots 273 toward the second slots 263 may be blocked.

Hereinafter, the operation of the solenoid valve 300 according to the third embodiment of the present disclosure will be described.

FIG. 16 is a sectional view illustrating an operating state of the solenoid valve according to the third embodiment of the present disclosure. Referring to FIG. 16, when an electric signal is transmitted and power is applied to the excitation coil assembly (not shown), a magnetic force acts between the magnet core 150 and the armature 120 and an attractive force acts between the magnet core 150 and the armature 120 due to the magnetic force. When the attractive force for raising the armature 120 is larger than the elastic force of the elastic member 140, the armature 120 moves while compressing the elastic member 140. Accordingly, the opening and closing member 121 of the armature 120 and the first orifice 332 of the valve seat 330 may be separated from each other to open the first orifice 332, and the brake fluid introduced from the first hydraulic port 11 may be supplied to the first orifice 332 through the first filter portion 261, the chamber 262 and the first slot 331. The brake fluid supplied to the first orifice 332 may be discharged to the second hydraulic port 12 through the second orifice 272 and the second filter portion 271.

Thereafter, when the power is turned off, as the magnetic force and attractive force between the magnet core 150 and the armature 120 disappear, the force for raising the armature 120 disappears, the armature 120 is returned to its original position by the elastic restoring force of the elastic member 140, and the opening and closing member 121 of the armature 120 and the first orifice 332 of the valve seat 330 are in close contact with each other so that the first orifice 332 may be dosed and the flow of the brake fluid may be blocked.

As is apparent from the above, the solenoid valve according to the present embodiments can perform the function of a check valve that allows the flow of the brake fluid in one direction but blocks the flow of the brake fluid in the opposite direction during non-operation.

Further, the solenoid valve according to the present embodiments can stably allow and block the flow of the brake fluid even under various operating environments and driving conditions to improve the performance and reliability of the product.

Further, the solenoid valve according to the present embodiments can have a small number of components and a simple structure to improve the assemblability and productivity of the product.

Further, the solenoid valve according to the present embodiments can reduce the manufacturing cost of the product.

Further, the solenoid valve according to the present embodiments can realize the miniaturization of the product, thereby improving the freedom of design of the brake system.

What is claimed is:

1. A solenoid valve which is installed in a bore of a modulator block having a first hydraulic port and a second hydraulic port to control a flow of a braking fluid, comprising:
   a sleeve formed to be perforated in an axial direction and including a flange portion fixed to the modulator block;
   an armature provided to be movable in the axial direction within the sleeve;
   a valve seat including a head portion coupled to an inner circumferential surface of one end of the sleeve and formed to be expanded in an outer diameter direction, a first orifice formed to be perforated in the axial direction, and a plurality of first slots formed to be recessed in the axial direction on an outer circumferential surface of the head portion;
   an elastic member provided to press the armature toward the valve seat;
   a magnet core provided to seal the other end of the sleeve and to separate the armature from the first orifice by an electromagnetic force;
   a first housing member including a circumferential portion having an inner circumferential surface coupled to the outer circumferential surface of the head portion and an outer circumferential surface coupled to an inner circumferential surface of the bore, a first filter portion provided to filter the foreign matter contained in the brake fluid or to prevent the inflow of foreign matter, a chamber provided to allow the brake fluid that has passed through the first filter portion to pass therethrough and to communicate with the first slots, a central portion provided on an inner side of the circumferential portion and having a second orifice formed to be perforated in the axial direction to communicate with the first orifice, a coupling portion formed to protrude from the central portion toward the valve seat to be inserted into an inner circumferential surface of the first orifice, a first step portion and a second step portion formed to be gradually stepped toward the outside at an end of the central portion facing the second hydraulic port, and a plurality of second slots formed to be perforated in the axial direction between the circumferential portion and the central portion and communicating with the chamber;
   a second housing member including a second filter portion provided to filter the foreign matter contained in the brake fluid or to prevent the inflow of foreign matter, a third orifice formed to be perforated in the axial direction to communicate with the second orifice, and a plurality of third slots formed to be perforated in a radial direction to communicate the second slots and the third orifice, and coupled to the inner circumferential surface of the circumferential portion and an outer circumferential surface of the first step portion; and
   a sealing member accommodated in a retainer groove formed by the second step portion and an end of the second housing member and formed to be inclined toward the second hydraulic port.

2. The solenoid valve according to claim 1, wherein:
   the sealing member includes a body portion seated in the retainer groove, and a lip portion provided to protrude from the body portion toward the inner circumferential surface of the circumferential portion and to be inclined toward the second hydraulic port.

3. The solenoid valve according to claim 2, wherein:
   the second housing member further includes a separation preventing protrusion protruding to be capable of being fitted between the body portion and the lip portion.

4. The solenoid valve according to claim 3, wherein:
   the second housing member further includes at least one gap forming protrusion protruding from an end of the second housing member facing the second hydraulic port so as to form a gap with the bore.

5. The solenoid valve according to claim 4, wherein:
   the armature includes an opening and closing member to open and close the first orifice and a seating portion to receive at least a portion of the elastic member.

6. A solenoid valve which is installed in a bore of a modulator block having a first hydraulic port and a second hydraulic port to control a flow of a braking fluid, comprising:
   a sleeve formed to be perforated in an axial direction and including a flange portion fixed to the modulator block;
   an armature provided to be movable in the axial direction within the sleeve;
   a valve seat including a head portion coupled to an inner circumferential surface of one end of the sleeve and formed to be expanded in an outer diameter direction, a first orifice formed to be perforated in the axial direction, and a plurality of first slots formed to be recessed in the axial direction on an outer circumferential surface of the head portion;
   an elastic member provided to press the armature toward the valve seat;
   a magnet core provided to seal the other end of the sleeve and to separate the armature from the first orifice by an electromagnetic force;
   a first housing member including a first filter portion provided to filter the foreign matter contained in the brake fluid or to prevent the inflow of foreign matter, a chamber provided to allow the brake fluid that has passed through the first filter portion to pass therethrough and to communicate with the first slots, and a plurality of second slots formed to be recessed in the axial direction on an outer circumferential surface thereof, an inner circumferential surface of the first housing member being coupled to an outer circumferential surface of the valve seat;

a second housing member including a second filter portion provided to filter the foreign matter contained in the brake fluid or to prevent the inflow of foreign matter, a second orifice formed to be perforated in the axial direction to communicate with the first orifice, a plurality of third slots formed to be recessed in the axial direction on an outer circumferential surface thereof to communicate with the second slots, and at least one gap forming protrusion protruding from an end of the second housing member facing the second hydraulic port so as to form a gap with the bore, and coupled to an end of the valve seat facing the second hydraulic port in a state of being spaced apart from the first housing member; and a sealing member accommodated in a retainer groove formed by the gap and the outer circumferential surface of the valve seat and formed to be inclined toward the second hydraulic port.

7. The solenoid valve according to claim 6, wherein:
the sealing member includes a body portion seated in the retainer groove, and a lip portion provided to protrude from the body portion toward an inner circumferential surface of the bore and to be inclined toward the second hydraulic port.

8. The solenoid valve according to claim 7, wherein:
the armature includes an opening and closing member to open and close the first orifice and a seating portion to receive at least a portion of the elastic member.

9. A solenoid valve which is installed in a bore of a modulator block having a first hydraulic port and a second hydraulic port to control a flow of a braking fluid, comprising:

a sleeve formed to be perforated in an axial direction and including a flange portion fixed to the modulator block;

an armature provided to be movable in the axial direction within the sleeve;

a valve seat formed in a hollow shape and having one end coupled to an inner circumferential surface of one end of the sleeve, the valve seat including a plurality of first slots formed to be perforated in a radial direction on a side surface of the valve seat to communicate the inside of the valve seat and the outside of the valve seat, and a first orifice formed to be perforated in the axial direction on an end of the valve seat facing the second hydraulic port to communicate the inside of the valve seat and the outside of the valve seat;

an elastic member provided to press the armature toward the valve seat;

a magnet core provided to seal the other end of the sleeve and to separate the armature from the first orifice by an electromagnetic force;

a first housing member including a first filter portion provided to filter the foreign matter contained in the brake fluid or to prevent the inflow of foreign matter, a chamber provided to allow the brake fluid that has passed through the first filter portion to pass therethrough and to communicate with the first slots, and a plurality of second slots formed to be recessed in the axial direction on an outer circumferential surface of the first housing member, an inner circumferential surface of the first housing member being coupled to an outer circumferential surface of the valve seat;

a second housing member including a second filter portion provided to filter the foreign matter contained in the brake fluid or to prevent the inflow of foreign matter, a second orifice formed to be perforated in the axial direction to communicate with the first orifice, a plurality of third slots formed to be recessed in the axial direction on an outer circumferential surface of the second housing member to communicate with the second slots, and at least one gap forming protrusion protruding from an end of the second housing member facing the second hydraulic port so as to form a gap with the bore, and coupled to an end of the valve seat facing the second hydraulic port in a state of being spaced apart from the first housing member; and a sealing member accommodated in a retainer groove formed by the gap and an the outer circumferential surface of the valve seat and formed to be inclined toward the second hydraulic port.

10. The solenoid valve according to claim 9, wherein:
the sealing member includes a body portion seated in the retainer groove, and a lip portion provided to protrude from the body portion toward an inner circumferential surface of the bore and to be inclined toward the second hydraulic port.

11. The solenoid valve according to claim 10, wherein:
the armature includes an opening and closing member to open and close the first orifice and a seating portion to receive at least a portion of the elastic member.

12. The solenoid valve according to claim 11, wherein:
the valve seat further includes a bent portion formed on the side surface so as to be bent inward.

* * * * *